Aug. 15, 1961  F. A. FORWARD ET AL  2,996,440
METHOD FOR THE PRODUCTION OF ZINC
Filed March 12, 1959
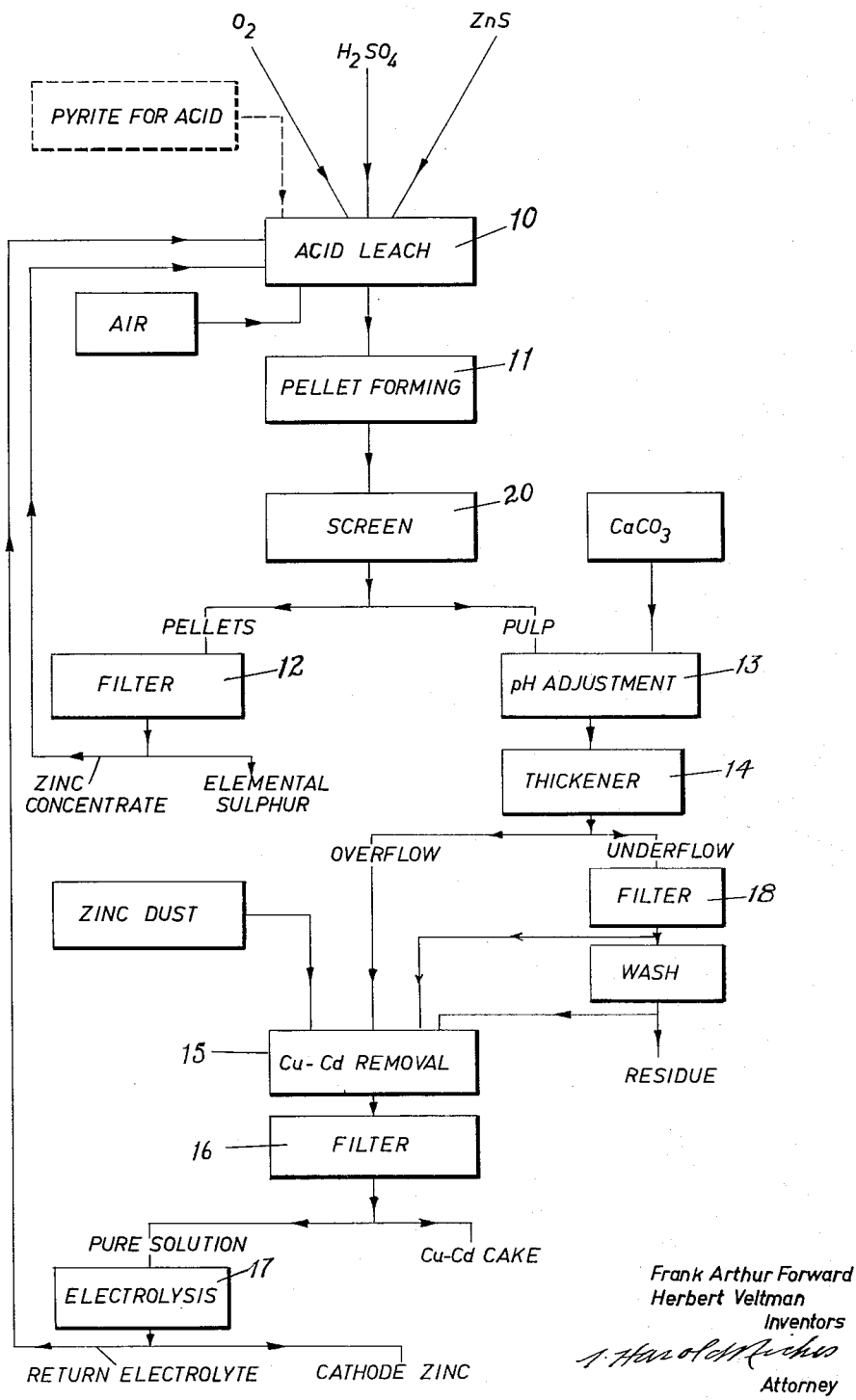
Frank Arthur Forward
Herbert Veltman
Inventors
Attorney 2,996,440
Patented Aug. 15, 1961

2,996,440
METHOD FOR THE PRODUCTION OF ZINC
Frank Arthur Forward, Vancouver, British Columbia, and Herbert Veltman, Richmond, British Columbia, Canada, assignors to Sherritt Gordon Mines Limited, Toronto, Ontario, Canada, a company of Ontario
Filed Mar. 12, 1959, Ser. No. 799,063
6 Claims. (Cl. 204—119)

This invention relates to the extraction and recovery of zinc from zinciferous sulphide ores and concentrates by hydrometallurgical methods.

The term "zinciferous" as used herein is intended to mean mineral sulphide ores and concentrates which contain zinc in economically recoverable amounts although values of ferrous and other non-ferrous metals may or may not be present in the material subjected to treatment.

Methods of producing zinc are well known and are widely used. Such methods involve, in the treatment of zinciferous sulphide ores and concentrates, such as sphalerite, ZnS, and marmatite (Zn, Fe)S, a preliminary oxidizing roasting step wherein the sulphides are reacted at elevated temperature with a free oxygen containing gas such as air to convert zinc sulphides to zinc oxides and sulphide sulphur to sulphur dioxide. Ferrous and other non-ferrous mineral sulphides which are present in the feed material to the roasting furnace, such as iron, lead, copper, cadmium and the like also are converted to oxides or sulphates. The resulting oxides then either can be leached with a dilute sulphuric acid solution to form a zinc sulphate solution which, after precipitation and separation of dissolved impurities, can be subjected to electrolysis for the electrodeposition of substantially pure zinc; or they can be mixed with a reducing agent, such as coal or coke, and subjected to a reducing reaction at a temperature above the boiling temperature of zinc, which is collected as a vapour and recovered in a condenser.

Processes for the treatment of zinciferous sulphides which involve a preliminary oxidizing roasting step have several important disadvantages. The capital, operating and maintenance costs of conventional roasting furnaces and dust collecting apparatus are high. Combustion gas discharged from the roaster contains a relatively high concentration of sulphur dioxide and, at least in settled areas, cannot be released to the atmosphere without preliminary treatment to remove the sulphur dioxide. Separation of sulphur dioxide from a combustion gas requires the installation, operation and maintenance of sulphur dioxide absorption apparatus and, usually, ancillary apparatus such as an acid plant. There is a further important disadvantage if iron is present in the zinc sulphide ores and concentrates. The conditions, such as the temperature, under which the roasting operation is conducted favour the combination of zinc and iron to form zinc ferrate or zinc ferrite from which the zinc cannot be recovered either by leaching or distillation. This problem is particularly acute in the treatment of sulphides in which zinc and iron are present in solid solution with each other in the form of a mineral known as marmatite (Zn, Fe)S. When this mineral is roasted, the zinc and iron oxides form a compound known as zinc ferrite which is insoluble in dilute solutions of sulphuric acid. Thus, the roasting operation usually must be conducted under carefully controlled conditions to minimize the formation of zinc ferrate or zinc ferrite.

Methods are known in which zinciferous sulphide ores and concentrates can be leached with an aqueous acid or aqueous alkaline leach solution in the presence of a free oxygen containing gas such as air, oxygen enriched air or oxygen. The high sulphide sulphur content of the zinciferous ore or concentrate may present a problem in this type of oxidation leaching process. If there is an available market for ammonium sulphate, the sulphides can be leached with an aqueous ammoniacal leach solution in the presence of a free oxygen containing gas to produce an ammoniacal solution which contains zinc sulphate and ammonium sulphate. Dissolved zinc values and ammonium sulphate can be separately recovered from this solution. If there is no available market for ammonium sulphate, however, a leaching process involving the use of an alkaline leach solution requires provision for the regeneration of the leach solution which adds to the cost of the overall operation.

The use of a leaching process involving the use of an aqueous acid leach solution can be employed, but the high sulphur content of the sulphides again presents a problem. If the leaching operation is conducted at a temperature below about 175° C., sulphide sulphur, $S^{--}$, oxidizes rapidly to elemental sulphur, $S^0$, and at a temperature above the melting point of sulphur, about 119° C., is present in the slurry of solids and solution as liquid sulphur globules. Unoxidized zinc sulphide particles are "wetted" by the liquid sulphur globules and are occluded therein. That is, there is a strong force of adhesion between elemental sulphur in the liquid phase and unoxidized mineral sulphide particles. Thus, unoxidized sulphide particles are occluded in or covered by a film of sulphur and are protected from further oxidation and remain unoxidized. This results in the added costs involved in separating unoxidized zinc sulphides from the elemental sulphur and re-cycling them to the leaching step and of recovering the elemental sulphur in an acceptably pure condition.

A further procedure is to conduct the acid oxidation step at a temperature above about 175° C., at which temperature the sulphide sulphur oxidizes rapidly to sulphate sulphur. While this procedure results in the rapid extraction and dissolution of desired zinc values, the reaction must be conducted in costly high pressure, acid resistant pressure vessels and ancillary apparatus, also large volumes of acid are produced which present a disposal problem; and large volumes of oxygen are required to convert all the sulphide sulphur to sulphate sulphur.

We have found that operating and economic problems encountered in the extraction of desired zinc values from mineral sulphide ores and concentrates which contain zinc can be overcome by leaching the mineral sulphides with an aqueous acid leach solution which contains sulphuric acid in amount sufficient to combine with the zinc as zinc sulphate, at a temperature below the melting point of sulphur, about 119° C., and under a positive partial pressure of oxygen provided by a stream of a free oxygen containing gas such as air, oxygen enriched air or oxygen. We have found that the extraction and dissolution of desired zinc values proceeds rapidly with a high degree of extractive efficiency. Elemental sulphur is produced in the form of finely divided solid particles which do not "wet" the unoxidized particles and, thus, do not interfere with the oxidation of the sulphides. The elemental sulphur can be recovered from the overall process as product sulphur substantially free from impurities and suitable for use in industry. The leach solution, after purification, is in ideal condition for recovering the dissolved zinc by conventional procedures, such as by electrolysis in which substantially pure zinc is electrodeposited on cathodes.

The process which we have discovered is readily amenable to modification to meet the requirements of the sulphide ore or concentrate subjected to treatment. For example, if the mineral sulphides contain lead sulphide in addition to the desired zinc values, the lead is oxidized during the oxidizing reaction to lead sulphide which is insoluble in the solution and reports in the residue. It is not "wetted" by the sulphur during the elemental sulphur agglomerating step. Copper sulphides which may be contained in the mineral sulphides oxidize more slowly than sphalerite or marmatite during the leaching operation. Copper sulphides present in the slurry at the end of the oxidizing reaction are "wetted" by the elemental sulphur and are occluded in the liquid elemental sulphur globules during the elemental sulphur agglomerating step. Iron values are oxidized to ferric oxide or ferric hydrate which are insoluble in the leach solution, are not "wetted" by liquid sulphur and so report in the undissolved residue. Other non-ferrous metals present in the mineral sulphides report either in the solution, from which they can be separated without difficulty by known precipitation procedures, or in the undissolved residue, or in the elemental sulphur as will be described in detail hereinafter.

The invention in its simplest form comprises the steps of forming a slurry comprised of finely divided zinciferous mineral sulphides dispersed in an aqueous sulphuric acid solution which contains free sulphuric acid in amount substantially sufficient to combine with the zinc content of the mineral sulphides as zinc sulphate. The slurry is heated to and maintained at a temperature below the melting point of sulphur, preferably below about 112° C., and under a positive partial pressure of oxygen provided by a free oxygen containing gas. The heating step is continued until extraction of zinc from the mineral sulphides substantially ceases with concurrent oxidation of the sulphide sulphur content of the zinc sulphides to solid, finely divided, elemental sulphur particles. The temperature of the slurry is increased with agitation to above the melting point of sulphur, for example to about 130° C. to 150° C., at the end of the oxidation period and is maintained at that temperature to melt the elemental sulphur and agglomerate it into liquid sulphur globules. The slurry is then cooled to below the melting point of sulphur to solidify the liquid sulphur globules into solid sulphur pellets which can be separated from the slurry such as by screening or centrifuging. The pregnant zinc sulphate leach solution can be separated from the undissolved residue, such as by filtration. Clarified solution can be purified by conventional methods to precipitate dissolved values of iron and other non-ferrous metals. After purification, the zinc sulphate solution, after adjustment of the pH value, if necessary, can be passed to an electrolysis step wherein zinc substantially free from impurities is electrodeposited on cathodes with concurrent regeneration of the acid content of the solution. Spent electrolyte from the electrolysis step can be re-cycled to the leaching step. Elemental sulphur pellets can be separated from entrained or occluded impurities by melting them and filtering the resulting molten bath to produce a sulphur product of substantially 100% purity.

While the process of this invention can be described in general terms, there are a number of factors which affect its operation. For example, at the operating temperature below the melting point of sulphur, substantially all the sulphide sulphur contained in the zinc sulphide is oxidized to elemental sulphur with the concurrent formation of little, if any, sulphate sulphur. Thus, very little, if any, sulphuric acid is formed during the oxidizing reaction. Thus, it is necessary to provide acid, preferably sulphuric acid, to the slurry in amount sufficient to combine with the zinc as zinc sulphate. Also, if values of other non-ferrous metals are present in the zinciferous mineral sulphides which convert to sulphate form, such as lead sulphide which converts to an insoluble lead sulphate, sufficient sulphuric acid must be provided to combine with such other metal values as sulphates. The sulphuric acid can be provided as such or it can be formed in the solution such as by providing finely divided pyrite, $FeS_2$, to the slurry.

Other factors which influence the reaction rate and the extent to which zinc is extracted from the mineral sulphides and dissolved in the leach solution are temperature, the hydrogen ion concentration of the solution, expressed as the pH value of the solution, the size of the mineral sulphide particles subjected to treatment, the pulp density, or the percentage of solids contained in the solution, the oxygen partial pressure, and agitation.

Factors which affect the oxidizing reaction are discussed in detail hereinafter, reference being made to the accompanying flow sheet drawing which illustrates a preferred modification of the process.

Referring to the modification of the process illustrated in the drawing, the zinc sulphides usually will be in the form of a concentrate. That is, zinc ore which is amenable to concentration usually is subjected to a preliminary concentrating step to eliminate waste or gangue, to increase the zinc content and reduce the amount of material to be treated. Also, if the sulphide ore contains values of metals such as lead and/or copper, it usually is subjected to a preliminary treatment to produce a concentrate which is high in zinc and low in lead and/or copper, and a concentrate which is high in lead and/or copper and low in zinc. Preliminary concentrating processes are well known in the art and may be necessary or advisable as a preliminary step in the overall process. To illustrate the operation of the process, it is assumed that the mineral sulphide ore has been subjected to a preliminary concentrating step and that only minor amounts of ferrous and other non-ferrous metals are present in the zinc concentrate.

Zinc sulphides, having a particle size smaller than about 0.074 mm. and preferably smaller than about 0.043 mm., that is smaller than about 200 mesh and preferably smaller than 325 mesh standard Tyler screen, are charged into a closed reaction vessel, such as an autoclave, indicated by the numeral 10, wherein they are leached with an aqueous sulphuric acid solution under a positive partial pressure of oxygen provided by a free oxygen containing gas such as air, oxygen enriched air, or oxygen.

The temperature at which the oxidizing reaction is conducted is important. It has been found when zinc sulphide is reacted with oxygen in an aqueous sulphuric acid solution at a temperature below about 175° C., sulphide sulphur, $S^{--}$, is oxidized to elemental sulphur, $S^0$, according to the reaction:

$$ZnS + \tfrac{1}{2}O_2 + H_2SO_4 \rightarrow ZnSO_4 + S^0 + H_2O \qquad (1)$$

The reaction proceeds relatively slowly at atmospheric temperature and the reaction rate increases as the temperature is increased. At a temperature above the melting point of sulphur, elemental sulphur is present in the slurry in molten form. Sulphur produced in this reaction is considered to be in rhombic or $\beta$ form which has a melting point of 119.25° C. Therefore, the oxidation reaction is conducted at a temperature below 119° C. However, as the elemental sulphur may be in a soft plastic condition at a temperature of from about 112° C. to 119° C., it is preferred to operate the process at a temperature below 112° C., preferably about 110° C.

The reaction velocity varies directly with the temperature. That is, the rate of the reaction is increased as the temperature is increased. Thus, while there is no critical lower temperature, we have found that operation of the process at a temperature within the range of from about 90° C. to about 112° C. results in the rapid extraction and dissolution of desired zinc values. The process can be operated at a temperature below 90° C., of course, but the reaction rate may be too slow for a commercially practical operation.

As all, or substantially all, the sulphide sulphur contained in the zinc sulphides is oxidized to elemental sulphur, it is necessary to provide the acid for combination with the zinc as zinc sulphate and, preferably, a slight excess in order to establish an initial hydrogen ion concentration equivalent to below about pH 2.5, and preferably below pH 2.0. Also, sufficient acid should be provided to combine with values of other metals present in the starting material which form soluble or insoluble sulphates during the oxidation reaction. It is found that the oxidation reaction proceeds only in an acid environment and while it will proceed slowly in a solution which has a pH value within the range of from pH 6 to pH 3, the pH value should be below about pH 2.5 to obtain satisfactory extraction and dissolution of zinc within a reasonable time. As acid is consumed during the reaction, either sufficient acid should be provided initially or during the reaction to maintain the pH value within the range of from about pH 2.5 to about pH 0.5 during the course of the oxidation reaction. The acid can be added as such or an acid forming compound, such as finely divided pyrite, $FeS_2$, which forms sulphuric acid under the oxidizing conditions according to the reactions:

$$FeS_2 + 2O_2 \rightarrow FeSO_4 + S^0 \quad (2)$$
$$2FeS_2 + 7O_2 + 2H_2O \rightarrow 2FeSO_4 + 2H_2SO_4 \quad (3)$$
$$4FeSO_4 + 2H_2SO_4 + O_2 \rightarrow 2Fe_2(SO_4)_3 + 2H_2O \quad (4)$$
$$Fe_2(SO_4)_3 + 3H_2O \rightarrow Fe_2O_3 + 3H_2SO_4 \quad (5)$$

can be added to the feed material.

It is found that the oxidation reaction proceeds with an oxygen partial pressure as low as about 5 pounds per square inch. However, the reaction proceeds more rapidly to completion and with less occlusion of zinc in the elemental sulphur as the oxygen partial pressure is increased. Also, the iron content of the sulphides converts more rapidly to basic iron sulphate which precipitates from the solution by hydrolysis as the reaction proceeds. Thus, it is preferred to use a partial pressure of oxygen of at least about 20 pounds per square inch. There is no apparent upper limit except that imposed by the apparatus employed. As it is desired to use conventional, low pressure apparatus, an upper limit of about 100 pounds pressure of oxygen, which is equivalent to about 500 pounds per square inch of air, produces very satisfactory leaching results.

Zinc concentrates received from a concentrator usually are relatively finely ground, of the order of smaller than 0.074 mm., 200 mesh standard Tyler screen, but may contain larger pieces of random sizes. It is found that the most satisfactory leaching results are obtained when the particles are of a size smaller than about 0.043 mm., that is, they will pass through a 325 mesh standard Tyler screen. They can be more finely ground, of course, if desired. Preferably, the sulphides are subjected to at least a brief grinding operation prior to the leaching step.

The most satisfactory ratio of solids to solution, or pulp density, in the leaching step depends on the zinc content of the zinc sulphides. If a high grade zinc concentrate is being treated, for example, from 40% to 50% zinc, a low pulp density, of the order of from 10% to 15% solids, should be employed. As the zinc content is reduced, the pulp density should be increased to a maximum of about 40% solids, in order to obtain a zinc sulphate solution suitable for electrolysis.

The slurry of solids and solution is actively agitated to maintain the solids in suspension thus to expose maximum surface area for reaction with the free oxygen bearing gas and the sulphuric acid content of the solution.

Undissolved solids and elemental sulphur can be separated from the solution by any one of several procedures. In the modification of the process illustrated in the drawing, the slurry is heated to a temperature above the melting point of sulphur, for example, from about 130° C. to about 150° C. for a period of time sufficient to melt the elemental sulphur. Agitation is continued during this heating period and the molten sulphur agglomerates to form liquid sulphur globules. The slurry is then cooled in a pellet forming step 11 to a temperature below the melting point of sulphur to solidify the sulphur globules into sulphur pellets. The slurry can then be discharged from the pressure vessel and passed over a screen, such as a 100 mesh standard Tyler screen, to separate the sulphur pellets. The sulphur pellets can be melted and filtered according to conventional practice to separate the solid particles as indicated by the numeral 12. Elemental sulphur recovered from the sulphur purification step is of substantially 100% purity.

If zinc sulphides are the only solid particles separated from the sulphur in the sulphur purification step, they can be returned to the grinding step. However, if other metal values are included, the solids from the sulphur purification step can be treated according to conventional practice for the recovery of metals therefrom.

Undissolved residue can be separated from the solution by a conventional solids-liquid separation step, such as by filtration. Alternatively, the slurry, after the removal of elemental sulphur, which has a pH value of from about 1 to about 2.5 can be passed to a pH adjustment step 13 wherein the pH value is adjusted by the addition of a neutralizing agent, such as calcium carbonate, to about pH 4 to 5. A zinc sulphate electrolyte which contains from about 1 to about 5 grams of free sulphuric acid per litre is suitable for electrolysis.

Iron present in the zinc sulphate solution is precipitated therefrom as the pH value of the solution is increased to about pH 5.

The slurry comprised of zinc sulphate solution, undissolved residue, and precipitated iron is passed to a thickener 14. Overflow from the thickener is treated with zinc dust, as indicated by the numeral 15, to precipitate dissolved impurities such as copper and cadmium. Solids present in the solution are separated, such as by filtration, in filter 16. The clarified zinc sulphate solution is then in condition for passing to the electrolysis step 17 for the production of electrolytic zinc. Spent electrolyte from the electroysis step 17 can be returned to the leaching step of the process.

Underflow from the thickener 14 is passed to a filter 18. Filtrate from the filter is passed to the purification step 15 for addition to the solution treated in that step. Wash water used to wash the filter cake from filter 18 can be passed to the purification step 15 or recycled to the leaching step.

The following Example 1 illustrates the results which can be obtained in the operation of the process.

EXAMPLE 1

A zinc concentrate which contained 41.5% zinc; 10% iron; 7.8% lead; 24.5% sulphur; and 16.2% gangue or waste material such as silica, was ground to a particle size smaller than 0.043 mm., 325 mesh standard Tyler screen. 500 grams of ground concentrate were charged into an autoclave with 3,000 ml. of aqueous sulphuric acid solution which contained about 340 grams sulphuric acid, slightly in excess of the acid required to combine with the zinc as zinc sulphate. The resulting slurry, which had a pH value of about pH 0.5, contained 14% solids. The autoclave was closed, the agitator was started and oxygen was admitted to prevent the formation of hydrogen sulphide during the heating period. The slurry was heated to about 110° C. and the flow of oxygen was maintained to produce and maintain a partial pressure of oxygen of about 20 pounds per square inch. The oxidation reaction usually is exothermic and the desired temperature may be maintained by the autogenously generated heat. The reaction vessel can be heated, or cooled, as may be necessary according to conventional practice. The slurry was reacted for 1.5 hours and at the end of the oxidation step, the temperature of the slurry was increased to about 140° C. for 15 minutes to melt the sulphur which agglomerated into liquid sulphur globules. The slurry was then cooled below the melting point of sulphur to solidify the globules into pellets or pebbles which were separated from undissolved residue by passing the slurry over a 100 mesh standard Tyler screen.

The sulphur pellets contained 80% sulphur and 10% zinc as zinc sulphide. These pellets were melted and the molten sulphur filtered to produce an elemental sulphur product of substantially 100% purity.

Zinc sulphide particles separated in the sulphur filtration step were returned to the grinding step.

The slurry, after separation of the sulphur pellets had a pH value of about 1.5. Calcium carbonate was added to the slurry to increase the pH value of the solution from about pH 1.5 to from about pH 4 to 5. The small amount of iron dissolved in the solution precipitated during this pH adjustment.

The slurry was passed to a thickener. Zinc dust was added to the overflow from the thickener to precipitate minor amounts of copper and cadmium which had been dissolved in the solution during the leaching step. The zinc sulphate solution, which contained about 120 grams per litre of zinc, was separated from the precipitated solids by filtration and passed to the electrolysis step. The underflow from the thickener was filtered and washed to produce a residue which contained 25% iron; 20% lead; 0.2% zinc; and 3% sulphur.

The following examples illustrate the effect of temperature, oxygen partial pressure, hydrogen ion concentration, particle size and time on the operation of the process.

EXAMPLE 2

The process was operated at 90° C., 110° C., 115° C., 120° C., and 140° C. The concentrate was ground to a particle size of 100% smaller than 0.043 mm., 325 mesh standard Tyler screen. 500 grams of this concentrate were dispersed in 3,000 ml. of aqueous sulphuric acid solution. The pulp density of the slurry was 14% solids. Sulphuric acid was provided in the stoichiometric amount required for combination with the zinc and lead as sulphates, 190 ml. of 96% $H_2SO_4$ per charge of 500 grams of concentrate. The partial pressure of oxygen was 20 pounds per square inch and the time of the oxidation was 1.5 hours. The results obatined are set out in Table 1 below.

Table 1

| Temperature, °C | 90 | 110 | 115 | 120 | 140 |
|---|---|---|---|---|---|
| Solution: | | | | | |
| Zn—grams per litre | 47.0 | 64.0 | 75.0 | 53.0 | 57.0 |
| Fe—grams per litre | 7.8 | 2.3 | 2.0 | 0.9 | 0.9 |
| pH | 0.5 | 1.1 | 1.1 | 0.8 | 0.8 |
| Sulphur Pellets: | | | | | |
| Amount—grams | 224 | 152 | 139 | 207 | 203 |
| Average size, millimetres | 5 | 1 | 0.2 | 4 | 4 |
| Zn, percent | 33.0 | 15.2 | 12.5 | 27.7 | 25.0 |
| S⁰, percent | 38.4 | 69.2 | 75.4 | 49.2 | 52.1 |
| Zn Distribution: | | | | | |
| Solution, percent | 62 | 88 | 90.0 | 70 | 73 |
| Residue, percent | 1 | 1 | 2.0 | 2 | 2 |
| S⁰, Pellets, percent | 37 | 11 | 8.0 | 28 | 25 |

It will be noted that maximum extraction of zinc and its dissolution in the leach solution is obtained at a temperature within the range of from about 110° C. to 115° C.

EXAMPLE 3

This example illustrates the effect of the oxygen partial pressure. The conditions were the same as Example 2 above with the difference that the oxidation was conducted at 110° C. at partial pressures of oxygen of 10, 20 and 60 pounds per square inch. The results obtained are set out in Table 2 below.

Table 2

| $O_2$ Overpressure (p.s.i.) | 10 | 20 | 60 |
|---|---|---|---|
| Pellets: | | | |
| Amount (gm.) | 207 | 152 | 122 |
| Average diameter (mm.) | 3 | 1 | <0.2 |
| Zn, percent | 29.0 | 15.2 | 5.5 |
| S⁰, percent | 46.1 | 69.2 | 86.0 |
| Solution: | | | |
| Zn (g./l.) | 48.0 | 64.0 | 67.0 |
| Fe (g./l.) | 4.0 | 2.3 | 1.0 |
| pH | 1.0 | 1.1 | 1.0 |
| Zn Distribution: | | | |
| Solution, percent | 70 | 88 | 96 |
| Residue, percent | 1 | 1 | 1 |
| Pellets, percent | 29 | 11 | 3 |

It will be noted that increasing the partial pressure of oxygen results in improved extraction and dissolution of zinc, good results being obtained at a minimum pressure of about 20 pounds per square inch.

EXAMPLE 4

This example illustrates the effect of acid content of the solution on the extraction and dissolution of zinc. The conditions were the same as Example 2 above with the difference that a temperature of 110° C., an oxygen partial pressure of 20 pounds per square inch and an oxidation period of 4 hours were employed with varying amounts of added sulphuric acid. The results obtained are set out in Table 3.

Table 3

| $H_2SO_4$ (percent of stoichiometric amount for zinc) | 45 | 70 | 90 | 100 |
|---|---|---|---|---|
| Pellets: | | | | |
| Amount (gm.) | 242 | 177 | 126 | 87 |
| Average diameter (mm.) | 1.5 | 4 | 0.2 | <0.2 |
| Zn, percent | 40.0 | 27.2 | 11.5 | 3.8 |
| S⁰, percent | 13.9 | 24.0 | 73.2 | 90.4 |
| Solution: | | | | |
| Fe (g./l.) | 0.5 | 0.4 | 0.4 | 1.0 |
| Zn (g./l.) | 38.0 | 50.0 | 65.0 | 72.0 |
| pH | 2.1 | 1.7 | 1.4 | 1.2 |
| Zn Distribution: | | | | |
| Solution, percent | 51 | 75 | 91 | 97 |
| Residue, percent | 1 | 1 | 2 | 1 |
| Pellets, percent | 48 | 24 | 7 | 2 |

It will be noted that the acid must be provided in at least the stoichiometric amount required to combine with the zinc as zinc sulphate in order to obtain a satisfactory extraction of zinc and its dissolution in the leach solution.

EXAMPLE 5

This example illustrates the effect of grinding on the extraction and dissolution of zinc. The conditions of the oxidation step were the same as Example 2 above with the difference that the tests were conducted at a temperature of 110° C. for 1.5 hours at 20 pounds per square inch partial pressure of oxygen. The zinc sulphides were ground to different particle sizes.

Table 4

| Grind | 100%, 325[1] mesh | 98%, 325[1] mesh | 92%, 325[1] mesh | "as received" |
|---|---|---|---|---|
| Pellets: | | | | |
| Amount (gm.) | 152 | 150 | 230 | 230 |
| Average diameter (mm.) | 1 | 0.5 | 5 | 5 |
| Zn, percent | 15.2 | 15.0 | 33.0 | 33.0 |
| S⁰, percent | 69.2 | 69.8 | 35.0 | 35.8 |
| Solution: | | | | |
| Zn (g./l.) | 64.0 | 61.0 | 42.0 | 46.0 |
| Fe (g./l.) | 2.3 | 3.0 | 11.5 | 9.1 |
| pH (final) | 1.1 | 0.9 | 0.6 | 0.6 |
| Zn Distribution: | | | | |
| Solution, percent | 88 | 88 | 62 | 62 |
| Residue, percent | 1 | 1 | 1 | 1 |
| Pellets, percent | 11 | 11 | 37 | 37 |

[1] (325 mesh standard Tyler screen=0.043 mm.)

It will be noted that satisfactory extraction and dissolution of zinc is obtained under the prescribed conditions when treating zinc sulphides of a particle size smaller than 0.043 mm., that is, smaller than 325 mesh standard Tyler screen.

EXAMPLE 6

This example illustrates the effect of the time on the oxidation reaction. The conditions were the same as set out in Example 2 above with the difference that the oxidation was conducted at 110° C. under a partial pressure of oxygen of 20 pounds per square inch. The reaction was conducted for times of 0.5 hour; 1 hour; 1.5 hours; 2 hours; 3 hours; and 4 hours. The results obtained are set out in Table 5.

*Table 5*

| Leaching Time (hours) | 0.5 | 1 | 1.5 | 2 | 3 | 4 |
|---|---|---|---|---|---|---|
| Pellets: | | | | | | |
|   Amount (gm.) | 220 | 160 | 152 | 142 | 110 | 87 |
|   Average Diameter (mm.) | 8 | 1 | 1 | 0.5 | 0.2 | 0.2 |
|   Zn, percent | 35.0 | 7.5 | 15.2 | 10 | 6.3 | 3.8 |
|   S⁰, percent | 35.0 | 55.0 | 69.2 | 77.4 | 85.8 | 90.4 |
| Solution: | | | | | | |
|   Fe (g./l.) | 5.6 | 3.0 | 2.3 | 0.4 | 0.6 | 1.0 |
|   Zn (g./l.) | 41.0 | 62.0 | 64.0 | 65.0 | 70.0 | 72.0 |
|   pH (g./l.) | 0.6 | 0.9 | 1.1 | 1.3 | 1.3 | 1.2 |
| Zn Distribution: | | | | | | |
|   Solution, percent | 62 | 86 | 88 | 92 | 96 | 97 |
|   Residue, percent | 1 | 1 | 1 | 1 | 1 | 1 |
|   Pellets, percent | 37 | 13 | 11 | 7 | 3 | 2 |

It will be noted that under the described conditions of operation, the oxidation reaction proceeded rapidly for the first 1.5 hours and extraction and dissolution proceeded over the full 4 hour period with a total extraction of 97% of the contained zinc.

EXAMPLE 7

Four tests A, B, C and D were conducted under two sets of identical conditions. Tests A and B were conducted on solutions which contained initially no zinc and 50.7 grams pre litre of zinc respectively with an oxidation period of 1.5 hours. Tests C and D were conducted on solutions which contained initially no zinc and 55.0 grams per litre of zinc respectively with an oxidation period of 4 hours. In each instance, the oxidation was conducted at a temperature of 110° C. and under a partial pressure of oxygen of 20 pounds per square inch. The results obtained are set out in Table 6.

*Table 6*

| Leach Solutions | A | B | C | D |
|---|---|---|---|---|
| Zn, g.p.l. | 0 | 50.5 | 0.0 | 55.0 |
| Fe, g.p.l. | Nil | Nil | Nil | Nil |
| S (as SO₄), g.p.l. | 110 | 110 | 36.0 | 68.8 |
| Pellets: | | | | |
|   Amount (gm.) | 145 | 152 | 134 | 129 |
|   Average Diameter (mm.) | 0.2 | 0.2 | 0.2 | 0.2 |
|   Zn, percent | 18.5 | 12.5 | 10.5 | 9.2 |
|   S⁰, percent | 61.0 | 64.2 | 76.6 | 77.0 |
| End Solution: | | | | |
|   Zn, g.p.l. | 59 | 104 | 63.0 | 121.0 |
|   Fe, g.p.l. | 3.7 | 3.7 | 1.0 | 1.8 |
|   pH | 1.3 | 1.0 | 1.1 | 1.3 |
| Zn Distribution: | | | | |
|   Solution, percent | 86 | 89 | 92 | 94 |
|   Residue, percent | 1 | 1 | 1 | 1 |
|   Pellets, percent | 13 | 10 | 7 | 5 |

It will be noted from Table 6 that the extraction of zinc from the zinc sulphide improved as the oxidation period was extended from 1.5 to 4 hours and when zinc was present initially as a dissolved salt in the leach solution. Also, the solution obtained in tests B and D were satisfactory for treatment in the electrolysis step.

Departures can be made, of course, in the operation of the overall process from the modification illustrated in the drawing. This particular modification has the important advantage that solids-liquid separation steps, which take time and which involve capital, operating and maintenance expenses, are reduced to a minimum. However, the process can be operated on a continuous basis to produce a solution which contains a dissolved zinc content which is most satisfactory for the electrolysis step.

Elemental sulphur can be separated from the undissolved residue, if desired, outside of the leaching step. This can be effected by dispersing the solid residue in water, heating with agitation to melt and agglomerate elemental sulphur, and cooling the slurry to solidify the sulphur pebbles which can then be recovered by screening. Elemental sulphur can also be separated from the undissolved residue by a conventional flotation process to produce a concentrate which contains elemental sulphur and metal sulphides. This would involve only separating the solid residue from the solution by filtration, repulping the filter cake in water and passing the pulp to a conventional flotation cell.

The process of the present invention possesses a number of important advantages over the conventional methods of the prior art for the recovery of zinc from zinc sulphides. In conventional processes for the production of zinc from zinc sulphides by the electroylsis of zinc sulphate solutions, metal oxides produced in the oxidation roasting step are leached with a dilute sulphuric acid solution. By the present process, the desired zinc sulphate solution is prepared directly by leaching the zinc sulphides with a sulphuric acid solution under a positive partial pressure of oxygen, thus eliminating the roasting apparatus, sulphur dioxide absorption apparatus, acid plant, and dust collecting apparatus heretofore required in this type of process. There is no dust, dirt or noxious fumes either in the plant or discharged into the atmosphere. The relatively low temperature and pressure at which the oxidation step is conducted make possible the use of conventional low pressure equipment with no corrosion problem. Also, high recoveries of zinc from zinc sulphides are obtained which, heretofore, were considered impossible to realize by conventional processes involving preliminary oxidizing roasting steps. Acid is generated in the electrolysis step in amount stoichiometrically equivalent to the zinc electrodeposited. Thus, the only acid which must be added to the process is that required to replace the acid which is entrained with solids in the liquid-solids separation step or steps, and that which is converted to insoluble sulphates, such as lead sulphate.

What we claim as new and desire to protect by Letters Patent of the United States is:

1. The method of recovering zinc from zinciferous mineral sulphides which comprises the steps of dispersing finely divided zinciferous mineral sulphides in an aqueous medium to form a slurry, providing in said slurry sulphuric acid in amount sufficient to produce a pH value within the range of from about 0.5 to about 2.5 and to combine with the zinc content of said mineral sulphides as zinc sulphate; reacting said slurry at a temperature above about 90° C. but below the melting point of sulphur with a free oxygen containing gas at a positive partial pressure of oxygen above about 10 pounds per square inch; continuing said reaction within said temperature and pH ranges to extract zinc from said mineral sulphides and dissolve it in the aqueous sulphuric acid solution as zinc sulphite with concurrent oxidation of sulphide sulphur to elemental sulphur, separating elemental sulphur and undissolved residue from the zinc sulphate solution, and recovering zinc in elemental form from said zinc sulphate solution.

2. The method of recovering zinc from zinciferous mineral sulphides according to claim 1 in which elemental sulphur recovered from the oxidation step is separated from occluded solids to produce a sulphur product of substantially 100% purity.

3. The method of recovering zinc from zinciferous mineral sulphides according to claim 1 in which the oxidation reaction is conducted at a temperature within the range of from about 90° C. to about 110° C.

4. The method of recovering zinc from zinciferous mineral sulphides which comprises the steps of dispersing finely divided zinciferous mineral sulphides in an aqueous medium to form a slurry, providing in said slurry sulphuric acid in amount sufficient to produce a pH value within the range of from about 0.5 to about 2.5 and to combine with the zinc content of said mineral sulphides as zinc sulphate; reacting said slurry at a temperature above about 90° C. but below the melting point of sulphur with a free oxygen containing gas at a positive partial pressure of oxygen above about 10 pounds per square inch; continuing said reaction within said temperature and pH ranges to extract zinc from said mineral sulphides and dissolve it in the aqueous sulphuric acid solution as zinc sulphate with concurrent oxidation of sulphide sulphur to elemental sulphur, and thereafter heating said slurry with agitation to a temperature above the melting point of sulphur to form liquid sulphur globules; cooling said slurry to below the melting point of sulphur to solidify said elemental sulphur globules, separating elemental sulphur globules and undissolved residue from said slurry, and recovering zinc in elemental form from said zinc sulphate solution.

5. The method of recovering zinc from zinciferous mineral sulphides which comprises the steps of dispersing finely divided zinciferous mineral sulphides in an aqueous medium to form a slurry, providing in said slurry sulphuric acid in amount sufficient to produce a pH value within the range of from about 0.5 to about 2.5 and to combine with the zinc content of said mineral sulphides as zinc sulphate; reacting said slurry at a temperature above about 90° C. but below the melting point of sulphur with a free oxygen containing gas at a positive partial pressure of oxygen above about 10 pounds per square inch; continuing said reaction within said temperature and pH ranges to extract zinc from said mineral sulphides and dissolve it in the aqueous sulphuric acid solution as zinc sulphate with concurrent oxidation of sulphide sulphur to elemental sulphur; separating elemental sulphur from the slurry; adjusting the pH value of said slurry to within the range of from about pH 4 to about pH 5; separating zinc sulphate solution from said slurry; precipitating zinc substantially free from impurities from said solution by electrolysis; and re-cycling spent electrolyte which contains zinc as a dissolved salt from said electrolysis step to the first mentioned oxidation step of the process.

6. The method of recovering zinc from zinciferous mineral sulphides which comprises the steps of dispersing finely divided zinciferous mineral sulphides in an aqueous medium to form a slurry, providing in said slurry sulphuric acid in amount sufficient to provide a pH value within the range of from about 0.5 to about 2.5 and to combine with the zinc content of said mineral sulphides as zinc sulphate; reacting said slurry at a temperature above about 90° C. but below the melting point of sulphur with a free oxygen containing gas at a positive partial pressure of oxygen above about 10 pounds per square inch; continuing said reaction within said temperature and pH ranges to extract zinc from said mineral sulphides and dissolve it in the aqueous sulphuric acid solution as zinc sulphate with concurrent oxidation of sulphide sulphur to elemental sulphur; separating elemental sulphur and undissolved residue from the zinc sulphate solution; recovering zinc in elemental form from said zinc sulphate solution; and separating and separately recovering elemental sulphur and unreacted mineral sulphides from said undissolved residue.

References Cited in the file of this patent

UNITED STATES PATENTS

| | | |
|---|---|---|
| 1,278,308 | Cullen | Sept. 10, 1918 |
| 1,937,633 | Christensen | Dec. 5, 1933 |
| 1,937,636 | Christensen | Dec. 5, 1933 |
| 1,949,927 | Corson | Mar. 6, 1934 |
| 2,435,340 | Christensen | Feb. 3, 1948 |